US005983682A

United States Patent [19]
Parikh

[11] Patent Number: 5,983,682
[45] Date of Patent: Nov. 16, 1999

[54] WEATHERPROOF PADDLE LATCH

[75] Inventor: Bhupendra Parikh, Parma, Ohio

[73] Assignee: Cleveland Hardware and Forging Company, Cleveland, Ohio

[21] Appl. No.: 09/200,185

[22] Filed: Nov. 25, 1998

[51] Int. Cl.[6] .................................................. B60R 25/02
[52] U.S. Cl. .................................... 70/208; 292/DIG. 31
[58] Field of Search .............. 70/208–211; 292/DIG. 31, 292/336.3

[56] References Cited

U.S. PATENT DOCUMENTS

| | | | |
|---|---|---|---|
| 4,911,487 | 3/1990 | Rachocki | 70/208 X |
| 4,951,486 | 8/1990 | Braun et al. | 70/208 |
| 5,046,340 | 9/1991 | Weinerman et al. | 70/208 |
| 5,127,686 | 7/1992 | Gleason et al. | 70/208 X |
| 5,141,266 | 8/1992 | Braun et al. | 292/49 |
| 5,340,174 | 8/1994 | Bender et al. | 70/208 X |
| 5,526,660 | 6/1996 | Bennett et al. | 70/208 |
| 5,564,295 | 10/1996 | Weinerman et al. | 70/208 |
| 5,586,458 | 12/1996 | Weinerman et al. | 70/208 |
| 5,689,980 | 11/1997 | Weinerman et al. | 70/208 X |
| 5,820,174 | 10/1998 | Parikh | 70/208 X |
| 5,878,608 | 3/1999 | Alyanakian | 70/208 |

*Primary Examiner*—Suzanne Dino Barrett
*Attorney, Agent, or Firm*—Calfee, Halter & Griswold LLP

[57] ABSTRACT

A latch assembly for use as a closure device in a door or compartment cover has a pan adapted to be flush mounted in an exterior panel, with a paddle-type handle hinge mounted within a recessed area of the pan. A mounting plate on an interior side of the pan includes a latch mechanism mounting flange which extends away from the pan, and to which a latch mechanism having a pawl and a trip latch jaw is mounted. A cam is rotationally mounted tightly parallel against the mounting plate, and has a paddle contact pin which extends through cooperating openings in the mounting plate and a floor of the pan. Lifting of the paddle causes the cam to rotate and engage the pawl of the latch mechanism, thereby releasing the trip latch jaw from a locked position. A lock cylinder may be mounted in the pan with a locking cam positioned proximate to a portion of the cam, to thereby interfere with rotation of the cam. The rotational mounting of the cam tightly against the mounting plate occludes the cooperating openings in the mounting plate and pan floor to prevent the passage of moisture or foreign objects to the interior of the latch assembly.

8 Claims, 3 Drawing Sheets

WEATHERPROOF PADDLE LATCH

FIELD OF THE INVENTION

The present invention pertains generally to latches, latching systems, and lockable latches of the type used in closures such as doors and compartment covers.

BACKGROUND OF THE INVENTION

Latches with manually operated pawls are used on all types of closures such as doors, including vehicle compartment doors and doors to storage compartments. Typically, such latches have a rotatable latch which engages a striker bar to hold a panel or door closed. The latch is actuated either directly by a handle, or by a pawl which is rotated by connection to a handle. Some latches are actuated by a pivotally mounted paddle-type handle which is lifted out of the plane of the panel or door in which it is mounted to pivot about the hinge mount to actuate the pawl and/or latch with a sliding motion generally in the plane of the latch mount. Because the paddle induces a lateral force on the latch/pawl mechanism, the operation of many designs is not smooth.

In purely mechanical latch systems, because the latch is located on the interior side of the door or panel, and the handle on the exterior side, there must necessarily be an opening in the panel or door in which the latch is mounted. This opening presents the problem of moisture entering both the latch assembly and the compartment. In latches which employ rotatable handles to actuate the latch or pawl, the problem is fairly well managed by use of annular gaskets and seals. However, latches which have a sliding-type mechanism such as the paddle handled type have not heretofore been provided with adequate weather and moisture resistant structure.

The present invention overcomes these and other disadvantages of the prior art.

SUMMARY OF THE INVENTION

In accordance with one aspect of the invention, there is provided a latch assembly adapted for installation in an openable closure such as a door or compartment cover and operable to engage a striker to hold a closure in a closed position and to release engagement with a striker to allow the closure to be opened, the latch assembly including a mounting pan having a peripheral flange and side walls and a floor which define a recessed area in which a paddle is rotationally hinge mounted upon a hinge pin which traverses the recessed area of the pan, the paddle having an actuation tab proximate to an exterior side of the floor of the pan, a mounting plate attached to the pan on an interior side of the floor of the pan, the mounting plate having a major flat portion and a latch mounting flange which extends out of a plane of the major flat portion and generally away from the floor of the pan, a cam pivotally attached to the mounting plate, the cam having a pawl contact arm which is located proximate to a pawl of a latch mechanism mounted on the latch mounting flange of the mounting plate, and a paddle contact pin which extends through the mounting plate and the floor of the pan for contact with the actuation tab of the paddle, the latch mechanism having a pawl rotationally mounted within a housing and operably engaged with a trip latch jaw also rotationally mounted within the housing and spring biased to an open position whereby rotation of the pawl induced by contact with the pawl contact arm of the cam allows the trip latch jaw to rotate to the open position to thereby release the latch from engagement with striker.

These and other aspects and objects of the invention are herein described in particularized detail with reference to the accompanying to the accompanying Figures and claims.

DETAILED DESCRIPTION OF THE INVENTION

Figure 1:
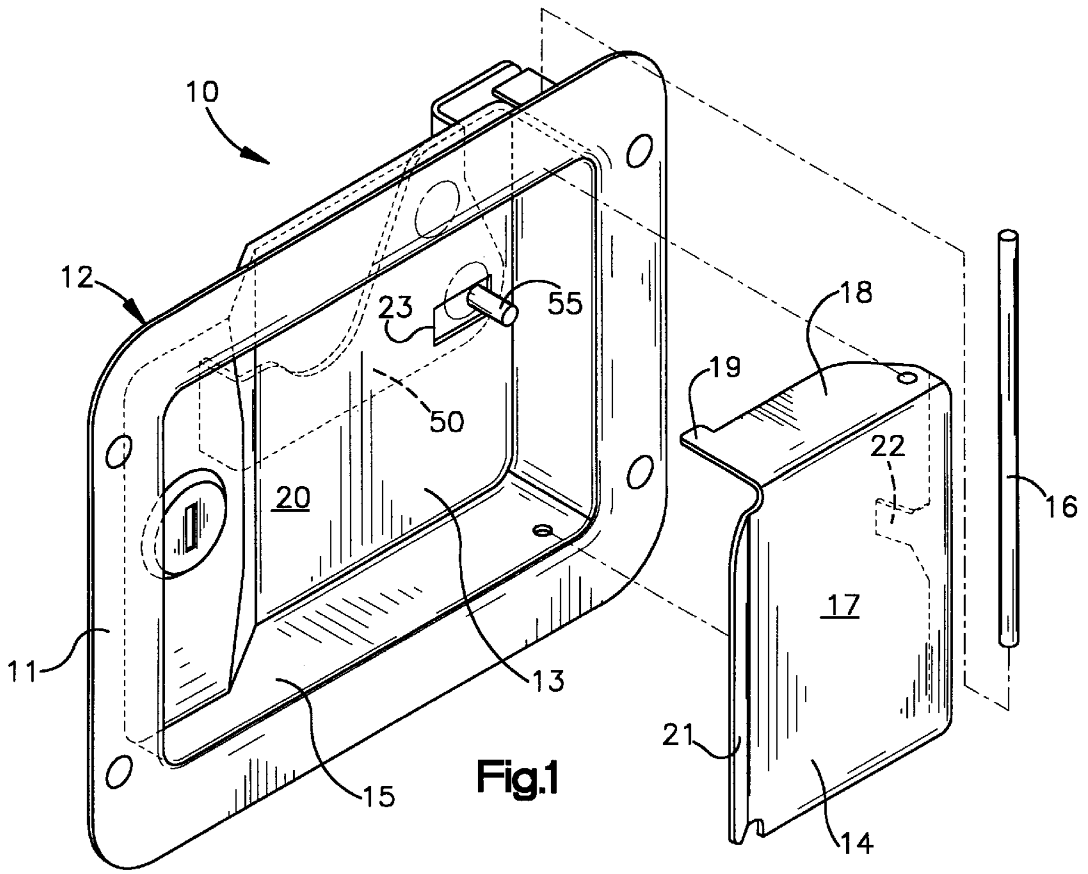
FIG 1 is a perspective assembly view of the paddle latch assembly of the present invention.
Figure 2:
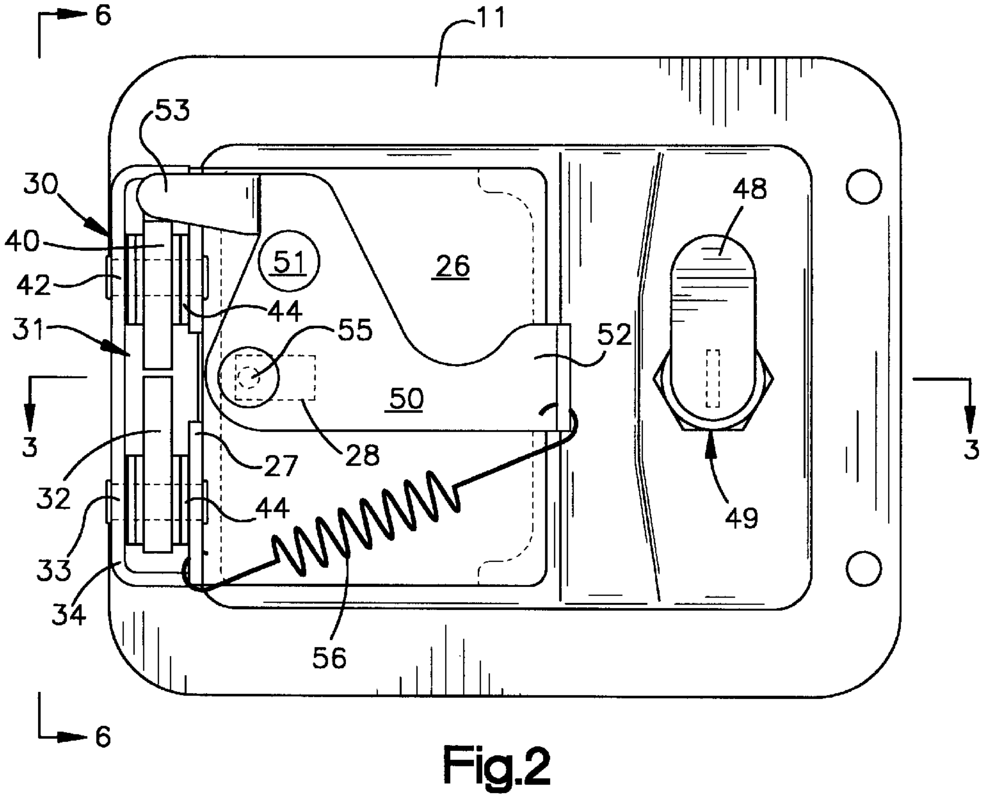
FIG. 2 is a rear elevation view of the paddle latch assembly of the present invention.
Figure 3:
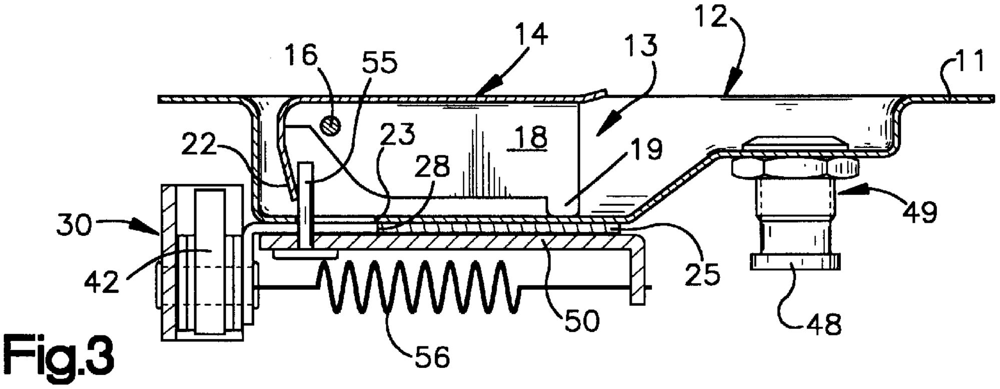
FIG. 3 is a side elevation view of the paddle latch assembly taken in the direction of the arrows 3—3 shown in FIG. 2.

Referring to the Figures, there is shown a paddle latch assembly indicated generally at 10, which includes a mounting pan 12 with a peripheral flange 11 contiguous with generally orthogonal walls 15 which surround a recessed area 13 in which is mounted a paddle type handle 14, also referred to herein simply as a paddle. The paddle is rotationally mounted upon a hinge pin 16, the ends of which are mounted in holes within opposing walls 15 proximate to one end of the recessed area 13. Preferably, the ends of hinge pin 16 are formed as flat heads which are substantially flush with the walls 15. The paddle 14 has a major planar surface 17 which is substantially flush with the peripheral flange 11 when in a nested position within the recessed area 13. The paddle further includes flanges 18 which extend downward from surface 17 and terminate in stands 19 which contact a floor 20 of the recessed area 13. One edge of surface 17 of the paddle is provided with a lip 21 to facilitate gripping of the paddle by insertion of fingers under surface 17. Opposite lip 21 is an actuation tab 22 which extends downward from surface 17 and is thereby located within the recessed area 13 proximate to floor 20.

As shown in FIGS. 2–5, a latch mounting plate 25 has a major flat portion 26 which is attached substantially flush against an interior side of the mounting pan 12, on the interior side of floor 20, opposite paddle 14. The mounting plate 25 is attached to the mounting pan 12 by rivets, spot welds or other suitable means of attachment. The mounting plate 25 further includes a latch attachment flange 27 which extends out of the plane of the major flat portion 26, somewhat away from the floor 20 of the mounting pan 12. In the example shown, the latch attachment flange 27 is substantially perpendicular to the major flat portion 26, and located parallel and proximate to the plane of the end wall 15 of the recessed area 13. With this construction, a latch mechanism, indicated generally at 30, is attachable to the latch attachment flange 27 and thereby positioned so that a striker-engaging opening 31 of the latch is oriented to face away from the mounting pan 12, and is preferably positioned to engage a striker S in the middle of the paddle latch assembly 10, as shown in FIGS. 6 and 7.

Figure 6:
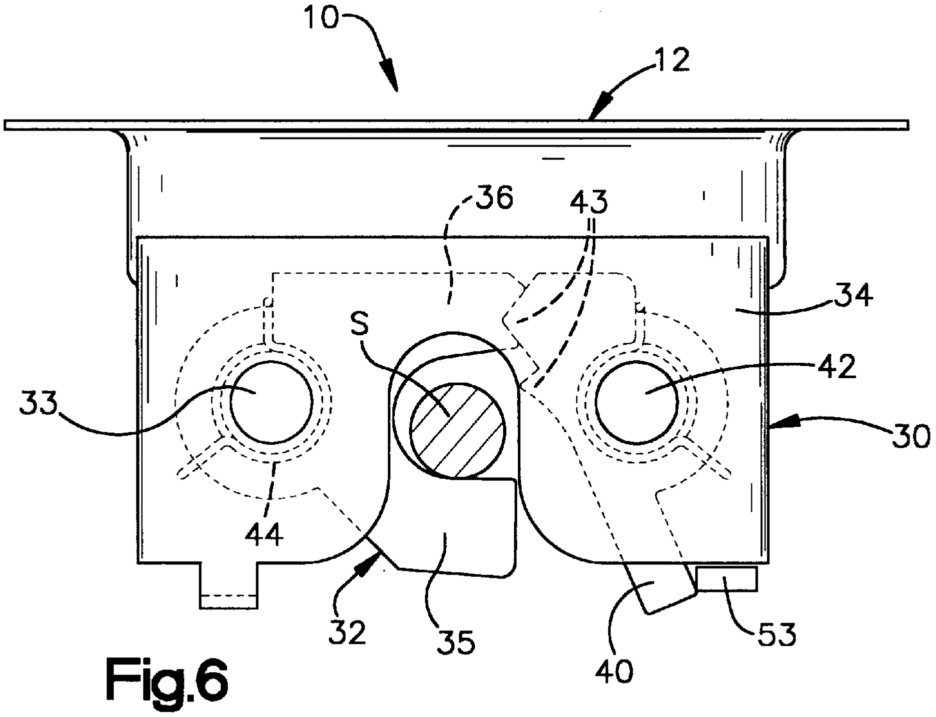
FIGS. 6 and 7 are elevational views of the latch mechanism of the paddle latch assembly of the present invention.
Figure 7:
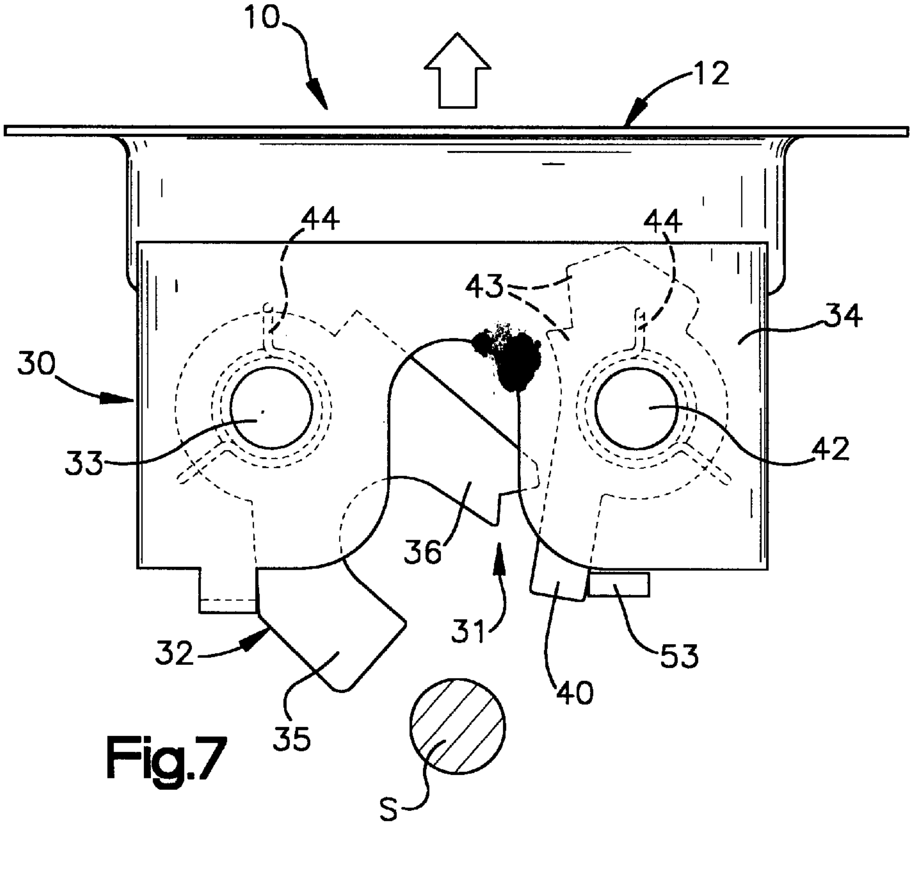

As further shown in FIGS. 6 and 7, one type of latch mechanism 30 which can be used with the present invention includes a rotationally mounted torsion spring biased trip latch jaw 32 mounted upon a pin 33 within a housing 34, with one striker-engaging arm 35, and a pawl-contact arm 36. A pawl 40 is also rotationally mounted upon pin 42 and torsion spring biased within housing 34 adjacent trip latch jaw 32 whereby one or more teeth 43 of the pawl contact the pawl contact-arm 36 of the trip latch. As viewed in FIGS. 6 and 7, clockwise rotation of the pawl 40, induced by a pawl contact arm 53 of cam 50 as further described below, releases the latch jaw 32 to the spring-biased open position shown in FIG. 7. Preferably, the housing 34 is attached to the latch attachment flange 27 by pins 33 and 42, and torsion springs 44 are journalled upon the pins.

A cam 50 is rotationally mounted upon the major flat portion 26 of the latch mounting plate 25, about a pin 51 which extends through the mounting plate and which may also extend through floor 20 of the mounting pan. The cam 50 includes a head 52 which is oriented to extend away from latch mechanism 30, and is located proximate to a locking cam 48 attached to a rotatable lock cylinder 49 mounted in pan 12. The lock cylinder 49 may be of the well known tumbler type operated by a key or electronic control system. With the distal end of the locking cam 48 positioned very near or against the head 52 of the latch cam 50 (a position ninety degrees from that shown in FIGS. 2 and 4) the cam 50 is prevented from rotating about pin 51.

In a region of cam 50 spaced from head 52 is located a paddle contact pin 55 which extends through an opening 28 in the mounting plate 25 and an opening 23 in the floor 20 of pan 12, to extend into the recessed area 13. The paddle contact pin 55 is thus positioned to be contacted by the actuation tab 22 of paddle 14 as the paddle is rotated out of the recessed area 13 about hinge pin 16. The paddle contact pin 55 moves with the cam 50 which rotates about pin 51, making a short arcuate path within openings 28 and 23. Because the cam 50 is in close sliding contact with the mounting plate 25, the opening 28 in the mounting plate through which the paddle contact pin 55 extends is blocked by the cam 50 so that moisture or foreign objects cannot pass through the mounting pan to the interior of the latch assembly or compartment in which the latch assembly is mounted. The cam 50 stays in close sealing contact with the latch mounting plate 25 regardless of the position of the paddle 14, so that the interior of the latch assembly is never exposed, as for example during operation of the latch.

Figure 4:
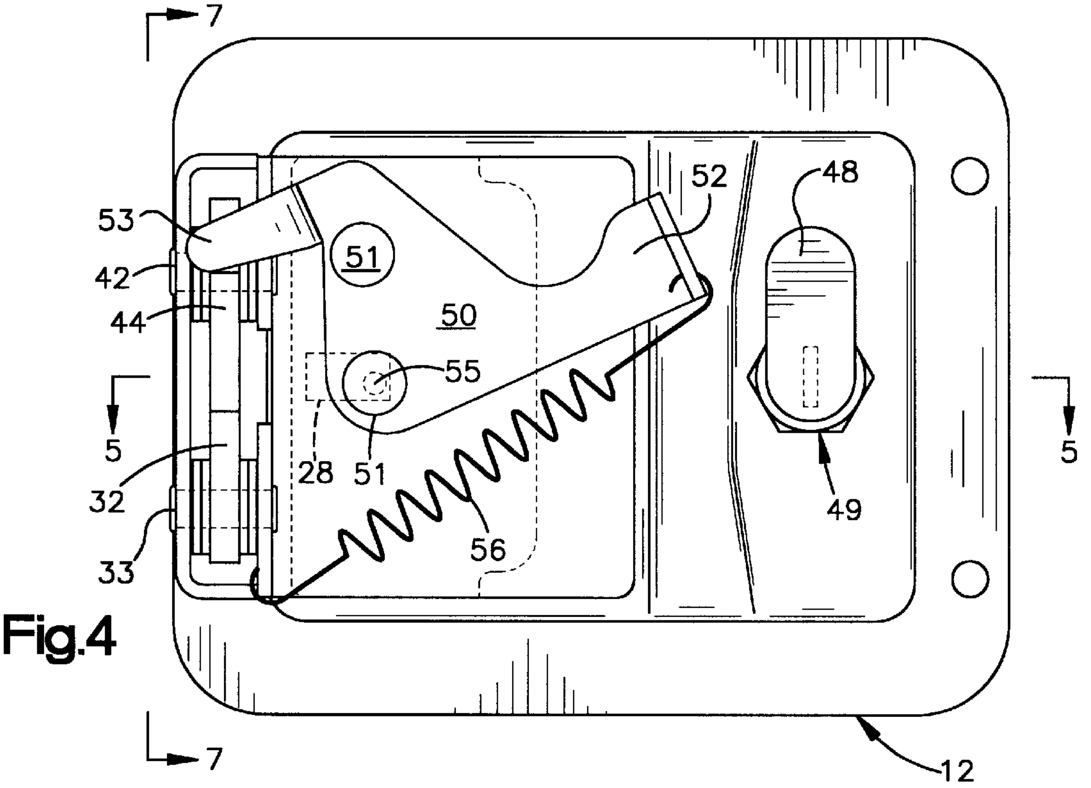
FIG. 4 is a rear elevation view of the paddle latch assembly of the present invention.
Figure 5:
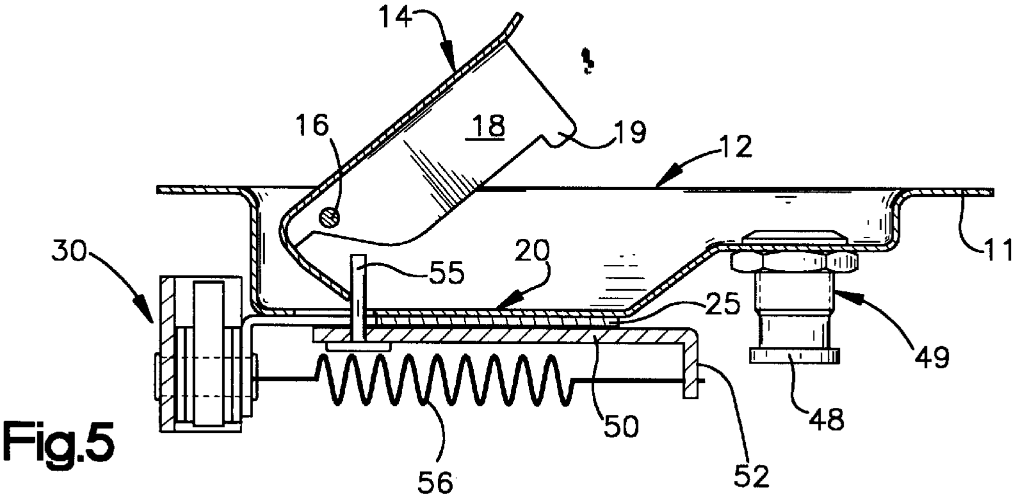
FIG. 5 is a cross-sectional view of the paddle latch assembly taken in the direction of the arrows 5—5 in FIG. 4.

The cam 50 further includes a pawl contact arm 53 which extends generally orthogonal to a major plane of the cam 50 and somewhat laterally into proximity with the latch mechanism 30, and more particularly into close proximity with the pawl 40. As shown in FIG. 4, as the cam 50 is rotated about pin 51 by the translation of pin 55 within openings 23 and 28, the pawl contact arm 53 is brought into contact with pawl 40, thereby causing the pawl 40 to rotate about its mounting pin 44, and thereby allowing the trip latch jaw 32 to rotate to its spring-biased open position.

A spring 56 is connected between the cam head 52 and the latch mounting flange 27 to bias the cam 50 in a position wherein the pawl contact arm 53 is not in contact with the pawl 40, and the paddle contact pin 55 biases the paddle 14 in a closed/recessed position by contact with paddle actuation tab 22.

In a typical installation, the described latch assembly 10 is mounted in a door or other compartment cover, with the peripheral flange 11 flush against a planar exterior surface, and the remainder of the pan 12 within the door, with the exterior surface of paddle 14 also substantially flush with an exterior surface of the door. With the latch assembly in an unlocked condition, rotation of the paddle 14 about hinge pin 16 contacts pin 55 of cam 50 to induce rotation of cam 50, about pin 51, to cause rotation of pawl 40 which releases the trip latch jaw 32 from engagement with a striker secured to the accompanying structure. The trip latch jaw 32 remains in an open position ready for re-engagement with the striker, irrespective of the position of locking cam 48. With the locking cam 48 in a locked position, the paddle 14 cannot be rotated about its hinge 16 as pin 55 of cam 50 is immovable when contacted by tab 22 of paddle 14, given that the cam 50 cannot rotate about pin 51 as the head 52 of cam 50 buts against locking cam 48.

The invention thus provides a paddle operated latch assembly which is substantially impervious to the passage of moisture or foreign objects through the pan and mounting plate, and which is easily operated by the paddle operated rotation of the pivotally mounted cam which contacts the pawl to release the trip latch jaw. The rotational mounting of the cam substantially flush against the mounting plate creates a barrier to the interior of the latch assembly which is not removed or opened even upon operation of the paddle and release of the trip latch jaw.

The invention has been shown and described with reference to a particular embodiment. It is to be appreciated that certain modifications and alterations may be made by those of skill in the art which although not expressly described herein are nonetheless within the panoply of concepts of the invention, as defined by the accompanying claims and equivalents thereto.

What is claimed as the invention is:

1. A latch assembly adapted for installation in an openable closure such as a door or compartment cover and operable to engage a striker to hold a closure in a closed position and to release engagement with a striker to allow the closure to be opened, the latch assembly comprising:

a mounting pan having a peripheral flange and side walls and a floor which define a recessed area in which a paddle is rotationally hinge mounted upon a hinge pin which traverses the recessed area of the pan, the paddle having an actuation tab proximate to an exterior side of the floor of the pan, a mounting plate attached to the pan on an interior side of the floor of the pan, the mounting plate having a major flat portion and a latch mounting flange which extends out of a plane of the major flat portion and generally away from the floor of the pan, a cam having a generally planar portion pivotally attached to the mounting plate so that the cam rotates in a plane closely parallel to and substantially flush against the major flat portion of the mounting plate, the cam also having a pawl contact arm which extends from the planar portion and which is located proximate to a pawl of a latch mechanism mounted on the latch mounting flange of the mounting plate, and a paddle contact pin which extends from the planar portion of the cam through openings in the mounting plate and the floor of the pan for contact with the actuation tab of the paddle, the planar portion of the cam substantially covering the openings in the mounting plate and the floor of the pan, the latch mechanism having a pawl rotationally mounted within a housing and operably engaged with a trip latch jaw also rotationally mounted within the housing and spring biased to an open position whereby rotation of the pawl induced by contact with the pawl contact arm of the cam allows the trip latch jaw to rotate to the open position to thereby release the latch from engagement with striker.

2. The latch assembly of claim 1 further comprising a spring which extends from the latch mounting flange of the mounting plate to the cam to bias the cam in a closed position wherein the paddle contact pin applies a force to the actuation tab of the paddle to thereby hold the paddle in a nested position within the recessed area of the pan.

3. The latch assembly of claim 1 further comprising a rotatable lock cylinder mounted within the pan and a locking cam attached to the lock cylinder on an interior side of the pan and able to be rotated by the lock cylinder and put in a locked position wherein the locking cam interferes with rotation of the cam relative to the mounting plate, pan, and latch mechanism.

4. The latch assembly of claim 1 wherein the cam is pivotally mounted on the mounting plate by a pin located generally laterally adjacent to openings in the mounting plate and the floor of the pan through which the paddle contact pin extends, whereby rotation of the cam about the pin causes the paddle contact pin to follow an arcuate path within the openings in the mounting plate and floor of the pan.

5. The latch assembly of claim 1 wherein the latch mechanism housing is attached to the latch mounting flange by pins which extend transversely between the latch mounting flange and a parallel portion of the latch mechanism housing, and wherein the trip latch jaw and pawl of the latch mechanism are each rotationally mounted upon one of the pins which extend between the latch mounting flange and the latch mechanism housing.

6. The latch assembly of claim 1 wherein the pawl contact arm of the cam has a first leg extends away from the mounting plate on which the cam is mounted, and a second leg which extends over the latch mounting flange of the mounting plate and terminates proximate to the pawl of the latch mechanism.

7. The latch assembly of claim 3 wherein the pan further comprises a lock cylinder landing within the recessed area of the pan in which a lock cylinder is mounted to thereby position a locking cam attached to the lock cylinder proximate to a portion of the cam when the lock cylinder is in a locked position, and to allow free rotational movement of the cam when the lock cylinder is in an unlocked position.

8. A latch assembly adapted for substantially flush mounted installation in an openable structure such as a door or cover to provide releasable engagement with a fixed striker, the latch assembly comprising:

a pan having a peripheral mounting flange adapted for substantially flush mounting upon an exterior of an openable structure such as a door, side walls and a floor which define a recessed area, a paddle rotationally mounted upon a hinge within the recessed area of the pan, the paddle having a major surface spaced from the floor of the pan and flanges which extend from the major surface to the floor of the pan, and an actuation tab proximate to the floor of the pan, a mounting plate having a major flat portion attached to an interior side of the floor of the pan, and a latch attachment flange which extends away from the interior side of the floor of the pan, a latch mechanism attached to the latch mounting flange of the mounting plate, the latch mechanism including a housing attached to the latch mounting flange by two spaced apart pins which extend transversely from the latch mounting flange to a wall of the housing which is substantially parallel to the latch mounting flange, a pawl rotationally mounted on one pin, and a trip latch jaw rotationally mounted on another pin, the pawl and trip latch jaw being in operational contact wherein rotation of the pawl allows rotation of the trip latch jaw to an open position, a cam having a planar portion rotationally mounted upon a pin which extends through the mounting plate, the planar portion of the cam positioned closely proximate and parallel to the major flat portion of the mounting plate, a paddle contact pin which extends from the cam through openings in the mounting plate and the floor of the pan, the planar portion of the cam substantially covering the openings in the mounting plate and the floor of the pan, a distal end of the pin located proximate to the actuation tab of the paddle, the cam further comprising a pawl contact arm positioned proximate to the pawl of the latch mechanism, whereby rotation of the paddle about its hinge mount causes the actuation tab of the paddle to contact the paddle contact pin of the cam to induce rotation of the cam about its mounting pin which causes the pawl contact arm of the cam to induce rotation of the pawl which allow the trip latch jaw to rotate to an open position.

* * * * *